US008249900B2

(12) United States Patent
Long et al.

(10) Patent No.: US 8,249,900 B2
(45) Date of Patent: Aug. 21, 2012

(54) SYSTEM AND METHOD FOR TERMINATION OF PENSION PLAN THROUGH MUTUAL ANNUITIZATION

(75) Inventors: Caitlin Long, Greenwich, CT (US); Duane Lauren Hughes, Montclair, NJ (US); William Edward Ryan, III, Short Hills, NJ (US); Kenneth Robert Pierce, Port Washington, NY (US)

(73) Assignee: Morgan Stanley & Co. LLC, New York, NY (US)

( * ) Notice: Subject to any disclaimer, the term of this patent is extended or adjusted under 35 U.S.C. 154(b) by 374 days.

(21) Appl. No.: 12/703,588

(22) Filed: Feb. 10, 2010

(65) Prior Publication Data
US 2011/0196705 A1 Aug. 11, 2011

(51) Int. Cl.
*G06Q 40/00* (2012.01)
(52) U.S. Cl. ............. 705/4; 705/35; 705/36 R
(58) Field of Classification Search ............. 705/4, 35, 705/36 R
See application file for complete search history.

(56) References Cited

U.S. PATENT DOCUMENTS

| | | | |
|---|---|---|---|
| 7,249,077 B2 * | 7/2007 | Williams et al. | 705/35 |
| 2004/0177022 A1 * | 9/2004 | Williams et al. | 705/36 |
| 2006/0212380 A1 * | 9/2006 | Williams et al. | 705/35 |
| 2008/0281742 A1 * | 11/2008 | Lyons et al. | 705/35 |

* cited by examiner

*Primary Examiner* — Neal Sereboff
(74) *Attorney, Agent, or Firm* — Mayer Brown LLP

(57) ABSTRACT

Disclosed herein is a system and method for terminating a pension plan through mutual annuitization. A mutual annuitization involves the formation of a new and dedicated mutual insurance company that issues group or individual annuity contracts to plan participants in a private pension plan. The plan sponsor would neither own any stock in the mutual insurance company, nor would it have voting or control rights or any right whatsoever to participate in the profits of the mutual insurance company. As a mutual insurance company, there are no shareholders as such. Instead mutuals have members, and it is the members who enjoy governance rights and participation rights in the company's profits, such as through policy dividend payments. In the mutual insurance company of the present invention, the pension plan participants are the mutual insurance company's sole members. The pension plan terminates following payment of a premium by the pension plan to the mutual insurance company for the issuance of the annuities, and the subsequent issuance of annuity contracts by the mutual insurance company to the plan participants. The premium is calculated based on a reduced cost of capital requirement over the life of the policy due to a reduction in the C4 component to zero after the first year of the program. The capital required to cover the C4 charge in the first year may be provided by a third party according to a surplus note or surplus maintenance agreement.

25 Claims, 6 Drawing Sheets

SYSTEM AND METHOD FOR TERMINATION OF PENSION PLAN THROUGH MUTUAL ANNUITIZATION

FIELD OF THE INVENTION

The present invention relates generally to systems and method for terminating pension plans and other similar plans. More specifically, the invention relates to systems and methods for terminating pension plans through mutual annuitization.

BACKGROUND OF THE INVENTION

As a benefit or incentive to employment, companies often offer private pension plans to their employees. These pension plans may come in a variety of forms. In general, however, each pension plan generally acts as a form of a retirement savings plan in which the employee, or plan participant, is entitled to receive certain benefits upon retirement or some other triggering event. To provide for payout of these benefits over time, the funds of a pension plan are generally invested in equity and debt securities that ideally provide a return on investment. For example, a typical strategy for investing the funds of a pension plan is known as a "60/40" strategy, meaning the funds are generally invested in about 60% equities and about 40% bonds.

In offering a pension plan to its employees, the employer is bound by certain laws and regulations to ensure that the plan is adequately funded and able to meet its obligations to the plan participants. A sponsor of a pension plan is also bound by a fiduciary duty to act solely in the interests of the plan participants. In addition, under certain circumstances a plan sponsor may be liable for losses arising out of decisions concerning the investment of plan funds. In meeting these duties and obligations, a sponsor will often need to devote a significant amount of time and resources to managing the pension plan.

As a result of the above obligations, the decision of an employer to offer a pension plan carries with it certain risks and liabilities. The funds of a pension plan may not always be sufficient to cover the obligations to the plan participants. In particular, the funding of a pension plan is susceptible to a combination of both investment risk and longevity risk (i.e., the risk of servicing plan participants over lives that are longer than expected). This underfunding of the plan may result in the need for the sponsor to infuse the plan with additional funds, and may also result in higher guaranty premiums as required by the Pension Benefit Guaranty Corporation (PBGC). In addition, the need to make payments to a pension plan may have a negative effect on the financial statements of a plan sponsor, and may lower sponsor shareholder equity. Finally, the inability of a sponsor to adequately fund the pension plan could also result in inadvertent termination of the plan.

In view of these risks, it may be more beneficial to both a plan sponsor and its participants to deliberately terminate a plan in whole or in part. For a sponsor, termination of all or a part of a pension plan may eliminate liability and overhead, and may allow for its pension obligations to be removed from the company's balance sheet. For a participant, a planned termination of the pension plan may lower the risk to his or her future benefits by shifting payment obligations under the plan to a larger or more established or more credit-worthy provider of benefits.

The only method available under the law for voluntarily terminating a pension plan is to purchase annuities. These annuities are purchased from commercial life and annuity insurers. However, termination through this method has significant drawbacks. First, with a commercial insurer that is a stock company, the benefits of any surplus capital over the amount required to fund the annuities inures to the benefit of the stockholders of the insurer, not to the pension plan participants who become policyholders of the insurer. Second, as the credit crisis of 2008 and 2009 illustrated, commercial life and annuity insurers are free to invest funds using strategies that expose policyholders to significant risk. As a result, a commercial insurer may opt to pursue a relatively risky investment strategy, such as a 60/40 strategy, which may provide for short-term gains to the stockholders of the insurer at the expense of increased risk to the payout of benefits to the policyholders. As shown in FIG. 1, the use of a 60/40 investment strategy carries with it a higher probability of a risk.

In addition, a commercial insurance company has exposures to risks on its other business lines, such as term life insurance. For example, a life insurance company offering life insurance plans may be exposed to risks associated with potential mortality catastrophic events, such as pandemics. Likewise, the capital supporting pension plan obligations may end up tied up in risky legacy investments, such as residential mortgage backed securities, commercial mortgage backed securities, commercial real estate loans, and commercial real estate direct investments. As a result, the new policyholders from the terminated plan may be subject to the risks of the insurer's legacy investments and exposures, as well as the "surplus strain" associated with writing new business.

In calculating a premium for its annuities, a commercial insurance company takes into account factors that are not directly related to the costs necessary to cover its annuity obligations. In particular, a commercial insurance company will calculate its premium according to rating agency and regulatory capital requirements, the weighted average cost of that capital (WACC), and the company's targeted return on capital. Commercial insurance companies also carry additional overhead due to advertising expenses, broker commissions, and salaries of marketing employees, new product developers, and underwriters. This overhead may be reflected in additional costs to the plan sponsor in purchasing the annuities, or in reduced payments to policyholders.

Furthermore, only pension plans of smaller size may be able to execute a standard termination using annuities offered by commercial insurance companies since there is insufficient overall capital capacity in the commercial insurance market. FIG. 3 shows U.S. annual sales over the last ten years of the types of annuities used in pension close-outs ("single premium group annuities" and "terminal funding annuities"). According to a 2009 LIMRA International report, the average aggregate total amount of pension plan annuities issued each year has fluctuated between around $2 billion and $3 billion per year. The limited capacity of the commercial market place has the effect of excluding over a hundred companies that have pension plan assets exceeding $2 billion, and preventing these companies from annuitizing their pension plans. Also, according to the 2009 LIMRA International report, cumulative sales during the ten previous years were approximately $25.1 billion. The top 20 U.S. pension plans, by contrast, held average assets of $28.8 billion. Hence, the annuitization of an "average" top 20 pension plan would consume ten years of total insurance industry capacity for this type of annuities. In other words, there is not enough capital capacity in the commercial insurance market to allow large plans to annuitize.

In addition, life insurance companies often calculate the amount of premium they charge the buyer of an insurance product by, among other factors, incorporating the cost of the regulatory capital that the insurer must hold, as required by insurance laws and regulations (referred to as "risk-based capital" or "RBC"). The amount of required risk-based capital for U.S. life insurance companies is established by the National Association of Insurance Commissioners ("NAIC"). The NAIC publishes model insurance statutes that have been adopted as governing law, largely as proposed by the NAIC, by the 50 states and the District of Columbia. These model statutes establish a risk-based capital formula for U.S. life insurance companies based on several risk factors, including asset risk (the "C1" component of the RBC formula), insurance risk (the "C2" component), market risk (the "C3" component), and operational risk (the "C4" component). The C2 component, insurance risk, may also be referred to as longevity risk in the context of fixed annuities. The C3 component, market risk, may also be referred to as, or may include, interest rate risk. The C4 component, operational risk, may also be referred to as business risk or premium risk. The statutory RBC requirement for the C4 component in a given year is based upon the amount of premium collected by a life insurance company during such year.

Insurance companies generally collect premiums over many years, but for certain products the insurance company collects only one single premium at the inception of the contract ("single premium" products) that compensate the insurance company for the many years of risk covered by the policy. For such single premium insurance products, such as those annuity products that qualify for pension plan termination, the RBC requirement is high in the first year because the C4 component is based on one large premium that the pension plan pays upfront. In subsequent years, the C4 charge is zero, because the insurance company collects no additional premiums for the policy.

To illustrate, the C4 requirement (after taxes) can amount to approximately 2% of the premium. For a hypothetical single premium group annuity of $1 billion, the C4 requirement would amount to approximately $20 million in the first year and zero in subsequent years. The cost to the insurance company of holding $20 million of capital in this example is high. As a result, requiring a commercial insurance company to maintain sufficient capital to cover the risk of an assessment is inefficient where the company issues annuities only infrequently or only on a one-time basis.

Insurance companies typically implicitly recover the cost of their required capital by pricing it into the premium for policies they sell. In general, insurance companies calculate their required capital on an aggregate basis rather than a policy-by-policy basis. It may not be practical for insurance companies to calculate policy-by-policy requirements, because of the large number of policies they manage, the many different policy inception dates, and the practice of most insurance companies to pool their investments. The latter especially makes a policy-by-policy calculation of required capital especially difficult, because RBC rules require the aggregated measurement of investment and interest rate risks and also apply co-variance factors that adjust the result for correlation across risks. Hence, in general, insurance companies calculate required capital on a "top down" basis rather than a "bottom up" basis when quoting a premium for an insurance policy.

In view of the above, it would be beneficial to be able to provide a system and method for terminating a pension plan that avoids all or some of the above shortcomings. In particular, it would be beneficial to provide a termination program that provides pension plan participants with greater security and less risk, and that allows pension plan participants to be insulated from the risks of the business for the benefit unaffiliated policyholders. It would also be beneficial to provide a program that transfers legacy liabilities of a plan provider to a party that is better-suited to handle the liabilities going forward, and allows the plan provider to free up capital. In addition, it would be beneficial to provide a termination program that allows pension plan participants, rather than stockholders, to share in any excess capital, and that (a) eliminates the need for overhead costs associated with marketing and advertising services, and (b) inefficient pricing related to the capital charge associated with the C4 component of the RBC formula. Finally, such a program should comply with applicable rules and regulations and should fulfill existing Department of Labor standards.

SUMMARY OF THE INVENTION

Disclosed herein are systems and methods, including computer software, for terminating a pension plan through mutual annuitization. The systems and methods serve to permit all or part of a pension plan to terminate while ensuring that all plan participants receive equivalent protections when their benefits are annuitized.

According to an embodiment of the invention, a method is presented for terminating all or a part of a pension plan through the purchase of annuities issued by a mutual insurance company, the pension plan having one or more plan participants, the pension plan being managed by a plan sponsor, and the mutual insurance company having been created for the purpose of issuing annuities to the plan participants, and the mutual insurance company having as its sole members the plan participants, the plan participants having all the benefits of ownership of the mutual insurance company, the method comprising: providing data representative of the pension plan, said data including the benefits owed under the plan to the plan participants; calculating a target risk-based capital ratio range for the capitalization of the mutual insurance company; calculating a funding ratio for the mutual insurance company, wherein the funding ratio reflects the approximate amount of capital required to realize the target risk-based capital ratio range; calculating a premium payment for the purchase of annuity contracts issued by the mutual insurance company, wherein the terms of the annuity contracts cover the benefits owed to the participants under the pension plan, and wherein the annuity contracts are issued to the one or more plan participants; wherein the purchase of the annuities by the pension plan via the premium payment to the mutual insurance company, and the issuance of the annuities by the mutual insurance company to the plan participants result in the termination of the pension plan; and wherein at least one of the steps of calculating a target risk-based capital ratio range, calculating a funding ratio, and calculating a premium payment is implemented by a processing system having software specifically adapted for such purpose.

In another embodiment, the target risk-based capital range may be equal to about 300% to about 350%.

In another embodiment, the above method further comprises the step of providing data representative of the asset risk for the portfolio of assets held by the mutual insurance company, and wherein calculating a funding ratio for the mutual insurance company is based on the asset risk in view of the target risk-based capital ratio range.

In another embodiment, the above method further comprises the steps of periodically calculating a risk-based capital ratio of the mutual insurance company; determining whether the plan sponsor is required to provide an additional capital payment to the mutual insurance company in accordance with a surplus maintenance agreement (for example, to fund the C4 component of the risk-based capital formula applicable to the mutual insurance company); and indicating the amount of the additional capital payment, if any.

In another embodiment, the above method further comprises the step of calculating a longevity risk for the annuity liabilities of the mutual insurance company, wherein calculating the funding ratio is based on the longevity risk such that the funding ratio is sufficient to account for the longevity risk.

In another embodiment, the above method further comprises the step of periodically calculating a policy dividend based on a proportion of excess capital as a percentage of liabilities, a difference between asset yield and the applied discount rate, and a realization of redundancies.

In another embodiment, the above method further comprises the step of providing data representative of plan participants, said data comprising the ages and gender of the plan participants.

In another embodiment, the above method further comprises the step of optimizing the portfolio of assets around the following variables; yield, liquidity, and security.

In yet another embodiment, the above embodiments are implemented through a computer-readable medium bearing a computer program containing instructions which, when implemented by a computer, cause the computer to execute the steps of the mutual annuitization program.

In yet another embodiment, an apparatus executes a program for terminating all or a part of a pension plan through the purchase of annuities issued by a mutual insurance company and comprises a processor, a display, and a memory coupled to the processor and containing instructions executable by the processor which, when implemented by the processor, cause the processor to execute the steps in the above embodiments.

According to another embodiment, a method for purchasing annuities from an insurance company is presented wherein a purchasing party assumes the risk for a guaranty fund assessment, the method comprising: receiving data representing the benefits owed to plan participants of a pension plan managed by the purchasing party; calculating the value of annuities sufficient to cover the benefits owed to plan participants of the pension plan; calculating a guaranty fund assessment value based on the value of the issued annuities; and wherein the first party provides to a third party entity capital in an amount equal to the calculated guaranty fund assessment value in return for a surplus note issued by the insurance company for the guaranty fund assessment value, the surplus note having a maturity date of one year from issuance and wherein the surplus note is not redeemable if the mutual company is assessed by a guaranty fund before the surplus note matures.

According to another embodiment, a method for calculating a reduced premium for the issuance of annuities is presented which comprises calculating a cost of capital requirement over the life of the policy; calculating a reduction in the cost of capital requirement resulting from a reduction in C4 charges; and calculating a reduced premium in an amount reflecting the value of the reduction in C4 charge.

These and other aspects and advantages will become apparent to those of ordinary skill in the art by reading the following detailed description, with reference where appropriate to the accompanying drawings. Further, it should be understood that the foregoing summary is merely illustrative and is not intended to limit in any manner the scope or range of equivalents to which the appended claims are lawfully entitled.

BRIEF DESCRIPTION OF THE DRAWINGS

The invention is described below in connection with the following illustrative figures, wherein.

DETAILED DESCRIPTION

Figure 1:
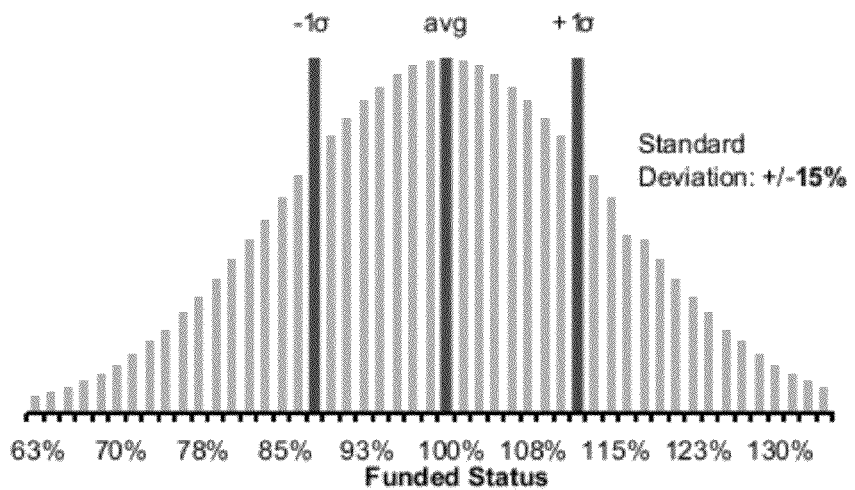
FIG. 1 is a chart illustrating the probability of meeting pension benefit payments under a "60/40" pension investment strategy, according to the prior art.

While the present invention is capable of being embodied in various forms, for simplicity and illustrative purposes, the principles of the invention are described by referring to several embodiments thereof. It is understood, however, that the present disclosure is to be considered as an exemplification of the claimed subject matter, and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention.

Described below are a method for calculating an insurance premium that reflects a reduction in the amount of required capital for single premium annuity products. The method employs a bottom-up approach to calculating the premium, which isolates the key component that causes required capital to be high in the first year in which the insurance company has written a single premium annuity policy. An embodiment of the invention uses a type of insurance regulatory capital called a "surplus note" or "surplus maintenance agreement" to reduce the buyer's cost by transferring the cost of the high first-year risk-based capital (as a result of the C4 component, as described above) to a third party. In this embodiment, the insurance company can charge the buyer a lower premium for the same insurance policy relative to the amount it would charge without the benefit of the invention.

The novel method for calculating an insurance premium may be used to implement the programs described below that allow for a pension plan or similar benefits plan sponsored by a company to be responsibly terminated through the use of a mutual insurance company. This mutual insurance company is capitalized by the pension plan, and issues annuities to the plan participants with terms that mirror the benefits of the pension plan. Through this process, dubbed "mutual annuitization," a pension plan is effectively transformed into a mutual insurance company whose sole purpose is paying annuity benefits to the former plan participants, and whose members consist entirely of former plan participants.

Terminating the pension plan via the mutual annuitization program described herein has several benefits over standard termination through the purchase of annuities from a commercial insurance company. First, mutual annuitization increases the likelihood that plan participants' benefits will be paid in full, since the investment approach of the mutual insurance company as described herein is lower-risk than that of most commercial insurers. In addition, mutual annuitization diminishes the investment and capitalization risks that normally face plan participants. Second, as policyholders of annuities from a mutual insurance company, plan participants would be entitled to participate in profits of the mutual insurance company over time. As with other mutual insurance companies, the policyholders of the mutual insurance company possess the voting rights as well as the right to participate in excess capital distributions through policy dividends, and to receive distributions of residual assets upon any liquidation of the mutual insurance company. These rights effectively increase the potential benefits to plan participants as compared to those to which they would be entitled were the pension plan to remain in place. Third, the mutual annuitization program removes barriers that restrict the ability of large plans to terminate due to capacity constraints of the commercial insurance market. Fourth, the mutual annuitization program avoids the forms of additional overhead associated with standard termination through a commercial life and annuity insurer—such as advertising expenses, broker commissions, and salaries of marketing employees, new product developers, and underwriters—which would otherwise manifest as additional costs to the plan sponsor or reduced payments to policyholders.

Figure 3:
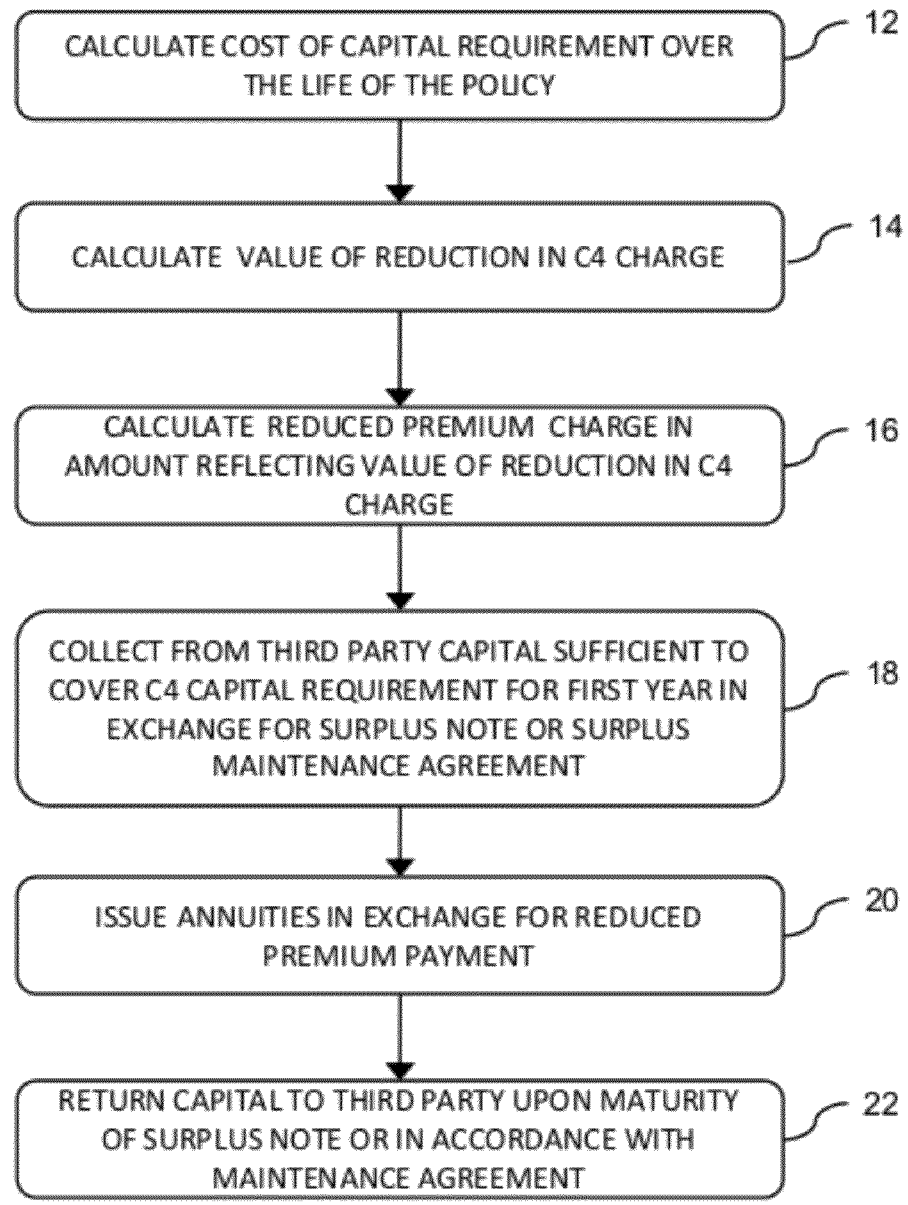
FIG. 3 is a flowchart showing a method for calculating a reduced premium for the issuance of annuities, according to an embodiment.

FIG. 3 provides a flowchart showing a method for calculating a reduced premium for the issuance of annuities, according to an embodiment. In the embodiment, by using the described method, an insurance company could reduce the premium it would normally charge the buyer of a policy. It would do so by first calculating the cost of the capital requirement over the life of the policy (which is the present value of the capital cost) in step 12, then by calculating the value of the reduction in C4 charge to zero after the first year in step 14, and then by calculating a premium in an amount that reflects the value of that saved capital in step 16, wherein the premium amount is reduced as compared to a premium that does not take into account a reduction in the C4 charge. In another embodiment, the insurance company could refund the buyer the cost of the reduced capital after the first anniversary of the sale of the policy.

In an embodiment, using the above method the insurance company could raise additional capital from an outside investor so the insurer does not need to pass through the cost of its own capital as a component of the policy premium. Such capital could take the form of a surplus note, surplus maintenance agreement, or other form of insurance regulatory capital. The outside investor could either be the buyer of the insurance product (i.e., the one or more annuities) or an unrelated third party. According to the embodiment of FIG. 3, in step 18 the insurance company collects capital sufficient to cover the C4 risk-based capital requirement in exchange for a surplus note or as part of a surplus maintenance agreement. In step 20, the insurance company accepts payment of the calculated reduced premium and issues annuities to the buyer of the policy. In step 22, the insurance company returns the capital to the third party upon maturity of the surplus note or in accordance with the maintenance agreement, which may generally be within one year from issuance of the annuities.

As another example, in the case of the mutual annuitization program described herein, the pension plan sponsor could be the outside investor that provides the insurer with capital via a surplus note or surplus maintenance agreement. By providing this capital, the plan sponsor absorbs the cost of the C4 risk-based capital requirement instead of the pension plan that purchases the annuity. Hence, the method for calculating a premium described above reduces the cost to the pension plan of the single premium group annuity relative to that provided by insurance companies that do not use the described method.

Figure 7:
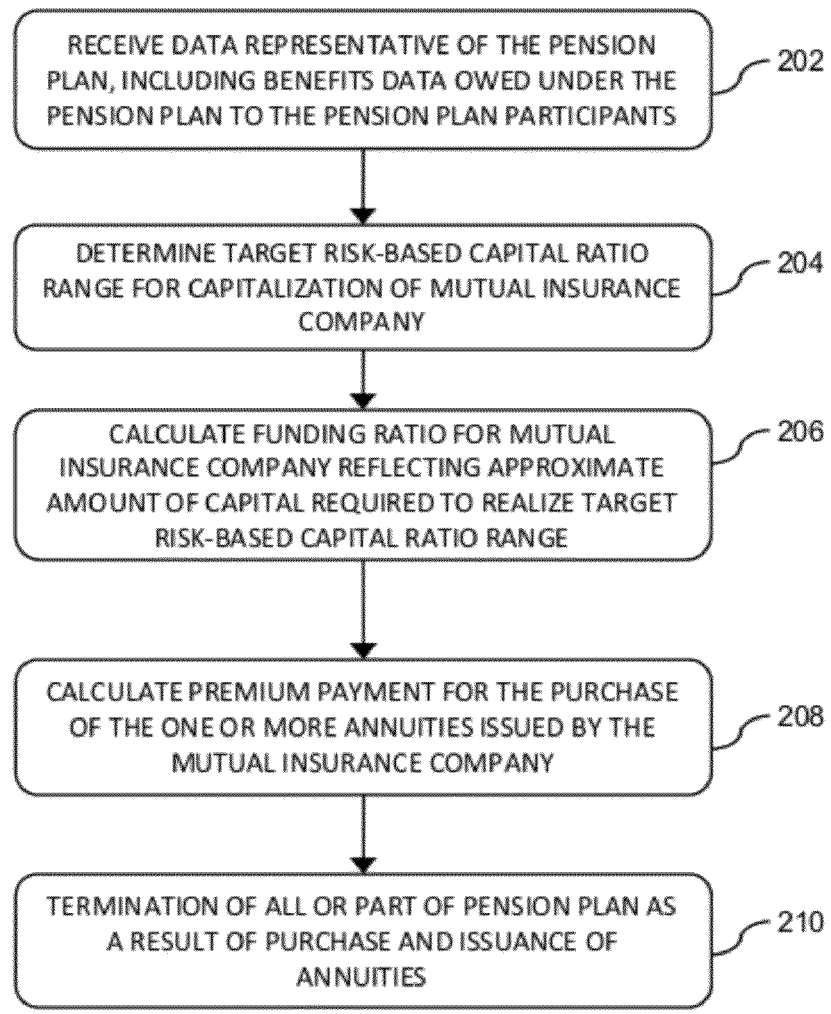
FIG. 7 is a flowchart showing a method for terminating a pension plan, according to an embodiment.

As noted above, the method of calculating a reduced premium payment for the issuance of one or more annuities may be used to implement a mutual annuitization program. FIG. 7 provides a flowchart a general method for terminating a pension plan according to an embodiment of the invention. At step 202, data is received that is representative of the pension plan, which may include information regarding the benefits owed under the pension plan to the plan participants. At step 204, a target risk-based capital ratio range is determined for capitalization of the mutual insurance company that is will issue the annuities. The target risk-based capital ratio range is based on the data representative of the pension plan, as further described below. At step 206, a funding ratio for the mutual insurance company is calculated that reflects the approximate amount of capital required to realize the target risk-based capital ratio range. At step 208, a premium payment is calculated for the purchase of the one or more annuities is calculated. According to one embodiment, the premium payment is calculated in accordance with the process described in FIG. 3. At step 210, the pension plan terminates upon purchase and issuance of the annuities.

Figure 4:
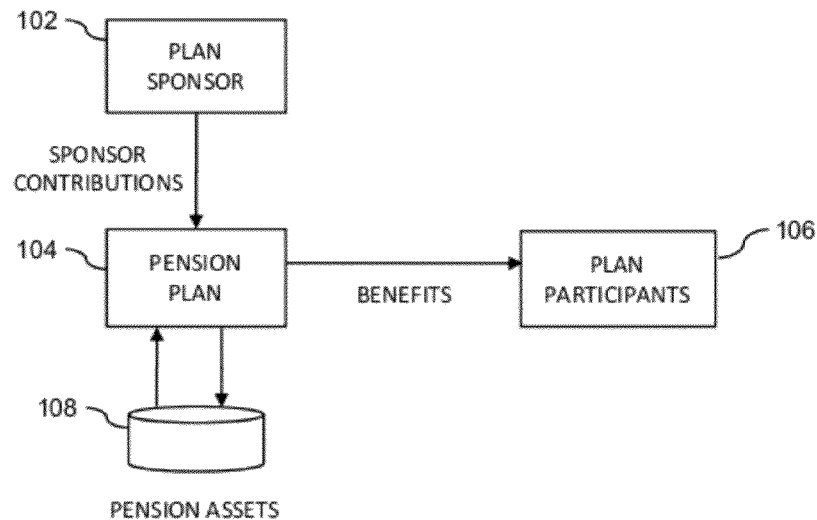
FIG. 4 is a schematic illustration showing principal transactions between pension plan entities prior to the pension plan termination program, according to an embodiment of the invention.

FIG. 4 provides a schematic illustration showing principal transactions between pension plan entities prior to a pension plan termination program, according to an embodiment of the invention. Initially, the plan sponsor 102 administers the pension plan 104. The plan sponsor may be any business entity that offers a pension plan to its employees. The pension plan 104 receives funding from the plan sponsor 102 and pays benefits to the plan participants 106 according to the terms of the pension plan. Depending on the terms of the pension plan, plan participants 106 may also contribute capital to the pension plan 104.

The pension plan 104 is generally funded by pension assets 108. These assets may be a portfolio of securities and bonds, or any form of principal bearing asset. The actual types of assets may depend on the investment strategy used by the managers of the pension plan. For example, the assets may be 60% equities and 40% bonds in accordance with a standard "60/40" pension investment strategy.

Figure 5:
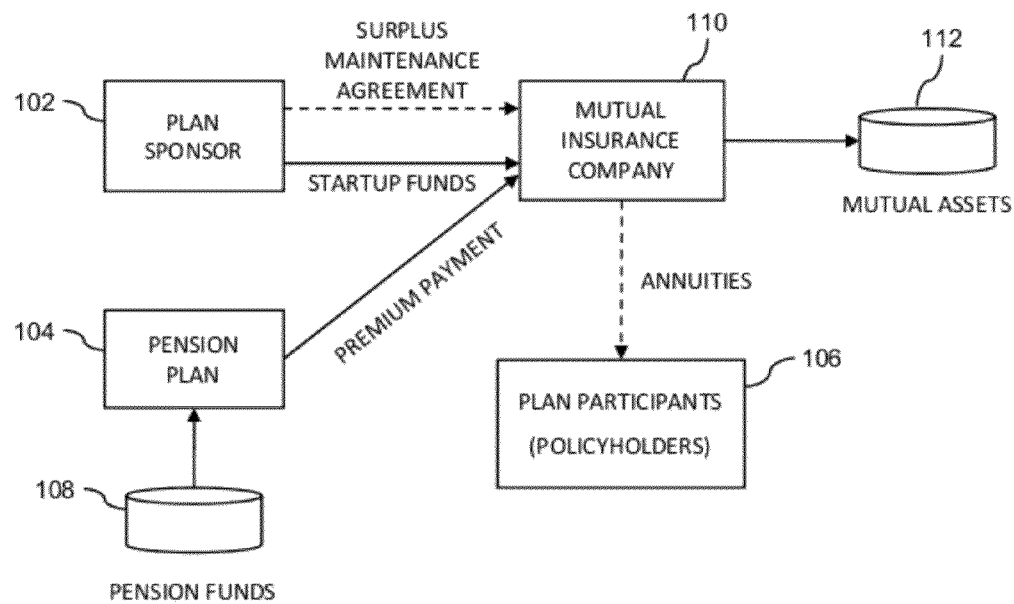
FIG. 5 is a schematic illustration showing principal transactions between pension plan entities at the inception of the pension plan termination program, according to an embodiment of the invention.

Upon determining that the pension plan should be terminated, the mutual annuitization program may be initiated. FIG. 5 provides a schematic illustration showing principal transactions between pension plan entities at the inception of the pension plan termination program, according to an embodiment of the invention. According to the mutual annuitization program, a dedicated mutual insurance company 110 is created which will issue annuity contracts to participants in the private pension plan. In one embodiment, the mutual insurance company 110 may issue a single group annuity to the pension plan or to the plan sponsor, which may then issue individual annuities to the plan participants. Alternative, the mutual insurance company may issue individual annuities to the former pension plan participants. The sole business purpose of the mutual insurance company 110 is to pay annuity benefits to the former pension plan participants.

The mutual insurance company 110 is generally not established with any initial private equity investors or controlling parties. As a result, the plan sponsor 102 may be involved in the formation and licensing of the mutual insurance company 110. For example, solely for the purpose of facilitating the licensing process, the plan sponsor 102 may provide startup funds to the new mutual insurance company, where the funds are sufficient to meet the minimum state funding requirements, and to cover fees to obtain or otherwise secure licenses in the appropriate states and for the necessary duration. Securing the necessary licenses may be accomplished by, for example, purchasing an inactive insurance company that already has the necessary licenses to cover the various states in which the plan participants reside. In addition, the plan sponsor may recruit a startup management team, including an initial board of directors, to manage the insurer. The board of directors, in turn, may appoint the initial officers of the mutual insurance company 110. In general, however, no officers, directors, or employees of the plan sponsor 102 would serve on the independent management team of the mutual insurance company 110, thereby avoiding the potential for conflicts of interest. Despite this initial involvement, once the mutual insurance company 110 begins to issue annuity contracts, the board of directors would be elected by, and serve at the pleasure of, the individual policyholders.

Figure 2:
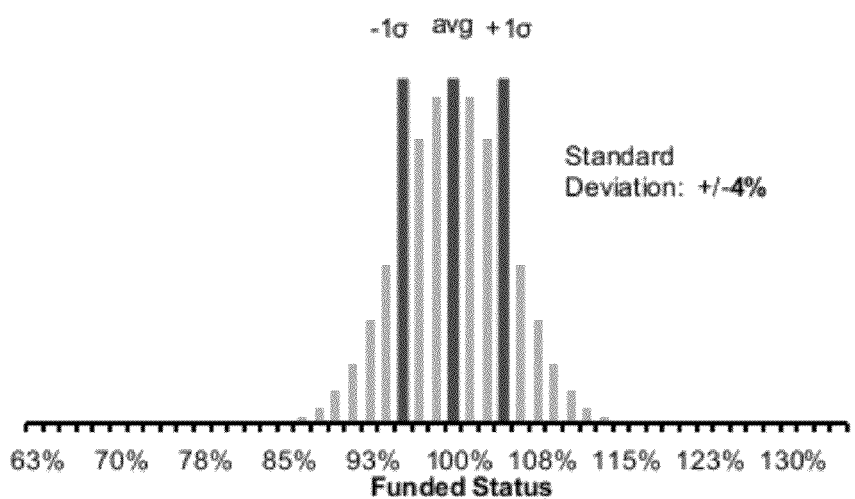
FIG. 2 is a chart illustrating the probability of meeting pension benefit payments under a strategy in which a portfolio is invested entirely in investment-grade bonds, according to an embodiment of the invention.

Once the mutual insurance company 110 is established, it is capitalized in order to back the annuities contracts that are to be issued to the plan participants 106. A funding ratio is defined as the ratio of mutual insurance company assets to mutual insurance company liabilities, which may be solely insurance statutory liabilities. The funding ratio is calculated to determine the initial amount of capitalization required for the mutual insurance company. Initially, the mutual insurance company may receive capital that is at least sufficient to pay the mutual insurance company's liabilities at the time of the mutual annuitization. In other words, the mutual insurance company will have a funding ratio of at least 100% at the time of the mutual annuitization in order to comply with regulatory requirements. The capital is invested in a mutual assets investment portfolio 112, which may consist entirely of high-quality fixed income securities or investment-grade bonds. As shown in FIG. 2, investing in investment-grade bonds results in a much smaller risk of shortfall as compared to commercial 60/40 investment strategies (FIG. 1). In exchange for the lessening of risk, there is also a smaller possibility of increased gains; however, this trade-off recognizes that the policyholders of the mutual are essentially creditors first and equity or residual owners second. The actual composition of the mutual assets investment portfolio 112 is selected so as to optimize the combination of three variables: liquidity, yield, and security. The weight given to each of these variables in optimizing the composition of the investment portfolio may depend on a variety of factors, including longevity risk and a funding ratio.

In a preferred embodiment, the mutual insurance company 110 has an initial funding ratio greater than 100%, resulting in the mutual insurance company being capitalized at an amount greater than the amount necessary to pay for its liabilities at the time of the mutual annuitization. This excess capital, as described below, is required in order for the mutual insurance company to meet a target risk-based capital ratio. The risk-based capital ratio is a measurement of the amount of capital a company to support the degree of risk associated with the company's operations and investments, and is defined as the company's capital divided by required risk-based capital.

A risk-based capital ratio of about 300% to about 350% is comparable or superior to that of the highest-rated commercial life insurance companies. As a result, the mutual insurance company 110 may initially be capitalized with the amount necessary to reach a target risk-based capital ratio of about 300% to about 350%. A less stringent target risk-based capital ratio may instead be used, such as about 250% to about 300%. Alternatively, in order to satisfy heightened requirements imposed by regulators, a higher target risk-based capital ratio may be used such as a ratio in the range of about 350% to about 400%. In the alternative, any RBC ratio within or across any of the above ranges may be used.

According to the mutual annuitization program described herein, the funding ratio of the mutual insurance company 110 may be that which is sufficient to meet a target risk-based capital ratio. Given a certain target risk-based capital ratio or a range thereof, a funding ratio may be calculated to reflect the approximate amount of excess capital necessary for the mutual insurance company 110 to reach the target risk-based capital ratio. The capital requirements necessary to reach a target risk-based capital ratio, or the funding ratio, may depend largely on the amount of risk in the mutual insurance company's mutual assets 112. The less risky the mutual assets 112 which make up the mutual insurance company's investments, the lower the funding ratio (or the amount of capital needed to reach the target risk-based capital ratio). The opposite also holds—the more risky the investment portfolio, the higher the funding ratio for the mutual insurance company. For a mutual insurance company with its assets invested in U.S. Treasury securities, the funding ratio necessary to reach a target risk-based capital ratio of about 300% to about 350% may be in the range of about 107% to about 109%.

To reach the funding ratio, the mutual insurance company 110 may receive capital from the plan sponsor 102. Alternatively, the mutual insurance company may receive its initial primary capital via a premium charged by the mutual insurance company 110 to the pension plan 104 for the purchase of the annuities on behalf of the plan participants 106. The premium payment amount may be calculated based in part on longevity risk, liquidity, and the funding ratio. In particular, the amount of the premium payment may reflect the amount of capital required to realize the target risk-based capital ratio range. The premium amount may include a margin equivalent to the profit margin that might have been charged by a commercial insurer as its profit. As a benefit to the plan participants, this margin would be returned to them over time due to their position as individual policyholders and members of the mutual insurance company.

Figure 6:
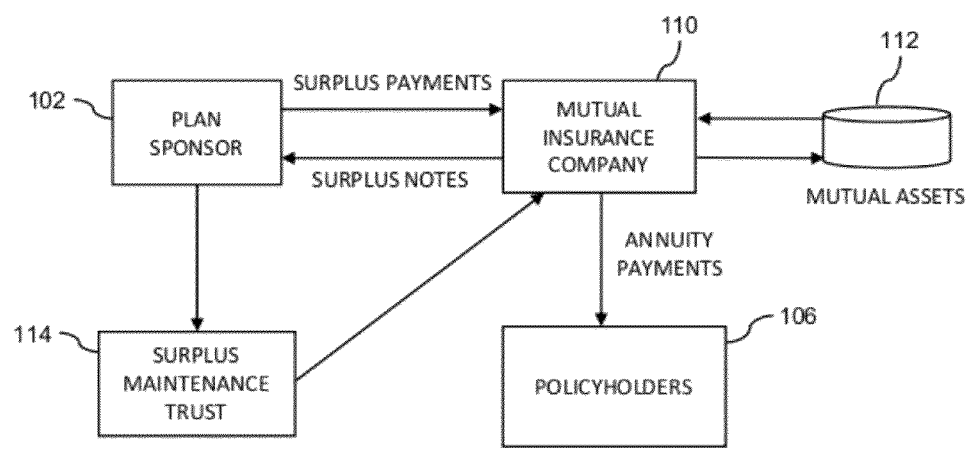
FIG. 6 is a schematic illustration showing principal transactions between pension plan entities after the pension plan termination program, according to an embodiment of the invention.

With respect to FIGS. 5 and 6, the plan sponsor 102 may contribute additional capital to the mutual insurance company 110 via two other methods. First, the plan sponsor 102 may initially enter into a multi-year "surplus maintenance agreement" with the mutual insurance company 110. Under the terms of the surplus maintenance agreement or other debt obligation, the plan sponsor 102 agrees to infuse additional capital into the mutual insurance company, if needed, in order for the mutual insurance company to maintain the target risk-based capital ratio, for example, about 300% to about 350%. In one embodiment, the surplus maintenance agreement is collateralized through a surplus maintenance trust 114 or other similar arrangement. The use of a surplus maintenance trust provides the additional benefit of preventing the mutual insurance company 110 from being exposed to the credit risk of the plan sponsor 102.

Second, the plan sponsor 102 may contribute additional capital through its purchase from the mutual insurance company 110 of a non-interest bearing "surplus note." This surplus note is a debt instrument that is subordinated to the claims of policyholders, and which can be issued only by insurance companies. According to an embodiment of the mutual annuitization plan, the mutual insurance company 110 issues the surplus note to receive from the plan sponsor 102 the capital necessary to cover the guaranty fund assessment risk. In particular, concurrent with the issuance of annuities to the plan participants 106, the mutual insurance company 110 may issue a surplus note to the plan sponsor 102 in return for capital that may be due pursuant to a guaranty fund assessment Rather than providing the capital directly to the mutual insurance company 110, and in exchange for a reduced premium for the issued annuities, the capital provided by the plan sponsor 102 may be deposited in the surplus maintenance trust 114 or other trust account. The terms of the surplus note may provide for repayment of the capital within one year of issuance, provided that no guaranty fund assessment occurs during such period (i.e., the mutual insurance company 110 is not assessed by a state guaranty fund). In this way, the plan sponsor 102 funds the capital charge of any guaranty fund assessment to the mutual insurance company 110.

The use of a surplus note to cover guaranty fund assessment, C4 charges, or similar calculable costs is not limited to the current mutual annuitization plan, and may be used in any transaction involving the purchase of annuities. In particular, the purchaser of annuities issued by an insurance company may provide the capital necessary to cover a guaranty fund assessment to the insurance company in exchange for a surplus note in the amount of the provided capital. Alternatively, instead of providing the funds directly to the insurance company, the purchaser of the annuities may provide the capital to—or channel the capital through—a bankruptcy proof vehicle which may be a single account, special purpose vehicle (SPV), or general account.

After being sufficiently capitalized, and having received payment for the issuance of the annuities in the form of a capital payment equal to the premium amount, the mutual insurance company 110 issues annuity contracts to the plan participants 106. Through the mutual annuitization process, the former plan participants become policyholders 106, and therefore its members. As members of the mutual insurance company 110, policyholders 106 may be entitled to disbursements of excess capital over time.

As noted above, initially the mutual insurance company 110 has excess capital due to a funding ratio in excess of 100% realized through the initial premium payment received from the plan sponsor 102. As annuity payments occur as expected, an excess capital amount can be calculated based on several factors. First, the amount of excess capital as a percentage of liabilities will increase as liabilities are paid down by the mutual insurance company 110. For example, with an initial liability value is $100 and a funding ratio is 105%, there is an initial excess capital value of $5. If the first $50 of annuity payments are made as expected, the $5 in excess capital will rise from 5% to 10% of liabilities. Second, the difference between the actual yield on the mutual assets 112 and the discount rate used to calculate the present value of the liabilities may give rise to an additional source of emerging excess capital. Third, the mortality tables prescribed by state insurance laws generally contain a cushion that provides for potential increases in life expectancy over time. If this redundancy is ultimately realized, this cushion may also contribute to an excess capital figure.

In connection with the mutual annuitization program, the excess capital of the mutual insurance company may be calculated based on the above factors, namely the proportion of excess capital as a percentage of liabilities, the difference between asset yield and the applied discount rate, and the realization of redundancies. Upon the determination of the management board of the mutual insurance company 110, a policy dividend may be paid to the policyholders 106 based on all or a portion of this excess capital.

Figure 8:
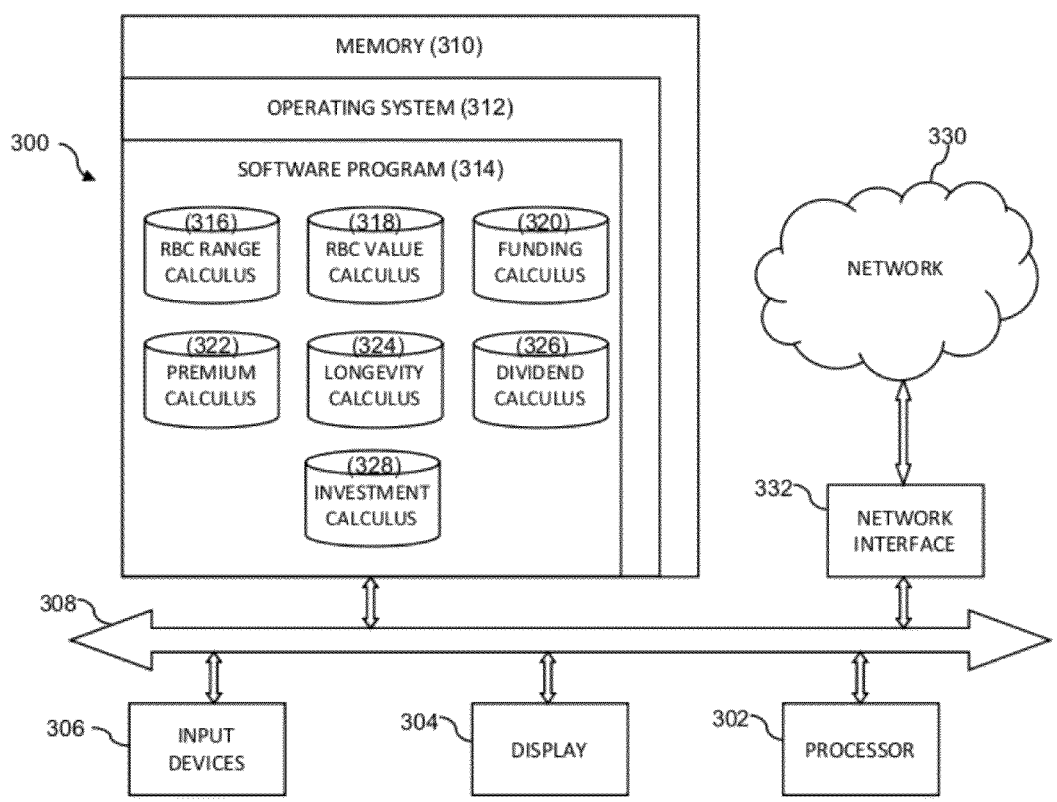
FIG. 8 is a schematic diagram of a processing system for implementing portions of the pension plan termination program, according to an embodiment of the invention.

As part of the mutual annuitization program, all or a part of the above calculations may be implemented or performed by a processing system having hardware or software specially adapted for such a purpose. Referring to FIG. 8, the variables for the mutual annuitization program are calculated using a processing system 300 that has software adapted to determining these values. The processing system 300 has a processor 302 for executing instructions from the memory 310, processing input from the input devices 306, communicating with the display 304, and processing data from any other peripherals. The processor 302, display 304, input devices 306, network interface 332, and other peripherals may be communicably coupled via a single data bus 308. Alternatively, these and other components may be joined by multiple buses, or several individual dedicated buses. The network interface 332 may communicably couple the processing system 300 to an external network 330 of other processing systems. In addition, multiple processing systems may be linked via the network in order to coordinate the determination of variables for the share program.

The memory 310 has stored therein an operating system 312 and a multiplicity of software programs or routines 314 designed to operate on the operating system 312. These software programs include: a program 316 that that calculates a target risk-based capital ratio range, a program 318 that calculates the risk-based capital value of the mutual insurance company, a program 320 that calculates a funding ratio for the mutual insurance company, a program 322 that calculates a premium payment for the purchase of annuity contracts issued by the mutual insurance company, a program 324 that calculates a longevity risk (C2) for the annuity liabilities of the mutual insurance company, a program 326 that calculates a policy dividend based on a proportion of excess capital as a percentage of liabilities, a difference between asset yield and the applied discount rate, and a realization of redundancies, a program 328 that calculates a liquidity value for an investment portfolio, and a program 330 that generates an optimal investment or asset portfolio based on three variables: yield, liquidity, and security. Programs 316 and 318 may receive data corresponding to the RBC formula components C1, C2, C3, and C4, as noted above, and may be configured to exclude any guaranty fund assessment risk in calculating risk-based capital ratios and risk based capital values. The memory 310 may further have stored therein a software program for receiving data corresponding to the guaranty fund assessment programs of various jurisdictions, and for calculating a guaranty fund assessment based on the value of issued annuities.

The software programs need not be independent as shown, and certain software programs may coincide with or include other software programs as, for example, subroutines or subprograms. For example, program 322 for calculating a premium payment may receive as some of its inputs a liquidity value along with the funding ratio value and the longevity risk value calculated by programs 320 and 324, respectively. Alternatively, program 322 may itself comprise programs 320 and 324 (or any other programs) as subroutines or subprograms. Similarly, a single program for (i) calculating a premium payment and (ii) determining an investment portfolio may receive as some of its inputs an optimal security value, a yield value, a liquidity value, a funding ratio value and a longevity risk value.

While the invention has been described in terms of several preferred embodiments, it should be understood that there are many alterations, permutations, and equivalents that fall within the scope of this invention. It should also be noted that there are alternative ways of implementing both the process and apparatus of the present invention. For example, steps do not necessarily need to occur in the orders shown in the accompanying figures, and may be rearranged as appropriate. It is therefore intended that the appended claim includes all such alterations, permutations, and equivalents as fall within the true spirit and scope of the present invention.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value or range. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it were individually recited herein.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

We claim:

1. A method for terminating all or a part of a pension plan having one or more plan participants, the pension plan being managed by a plan sponsor, the method comprising:
   receiving data representative of the pension plan, said data including benefits data owed under the pension plan to the pension plan participants;
   establishing a mutual insurance company, wherein the mutual insurance company is created for the purpose of issuing the one or more annuities to the plan participants, and wherein the mutual insurance company has as its members the plan participants such that the plan participants have all the benefits of ownership of the mutual insurance company;
   determining a target risk-based capital ratio range for capitalization of the mutual insurance company, based on at least the benefits data;
   calculating a funding ratio for the mutual insurance company, wherein the funding ratio reflects the approximate amount of capital required to realize the target risk-based capital ratio range;
   calculating a premium payment for the purchase of the one or more annuities issued by the mutual insurance company, wherein terms of the one or more annuities cover benefits owed to the plan participants under the pension plan, and wherein the one or more annuities are issued to the one or more plan participants;
   wherein the purchase of the one or more annuities by the pension plan via the premium payment to the mutual insurance company and the issuance of the annuities by the mutual insurance company to the plan participants result in the termination of all or a part of the pension plan; and
   wherein at least one of the steps of calculating a funding ratio, and calculating a premium payment is implemented by a processing system having software specifically adapted for such purpose.

2. The method of claim 1 wherein the target risk-based capital range is equal to about 300% to about 350%.

3. The method of claim 1 further comprising the step of providing data representative of the asset risk for the portfolio of assets held by the mutual insurance company, and wherein calculating a funding ratio for the mutual insurance company is based on the asset risk in view of the target risk-based capital ratio range.

4. The method of claim 1 further comprising the steps of:
   periodically calculating a risk-based capital ratio of the mutual insurance company;
   determining whether an additional capital payment to the mutual insurance company is required in accordance with a surplus maintenance agreement; and
   indicating the amount of the additional capital payment.

5. The method of claim 1 further comprising the step of calculating a longevity risk for the annuity liabilities of the mutual insurance company, and wherein calculating the funding ratio is based on the longevity risk such that the funding ratio is sufficient to account for the longevity risk.

6. The method of claim 1 further comprising the step of periodically calculating a policy dividend based on a proportion of excess capital as a percentage of liabilities, a difference between asset yield and the applied discount rate, and a realization of redundancies.

7. The method of claim 1 further comprising the step of providing data representative of plan participants, said data comprising the ages and gender of the plan participants.

8. The method of claim 1 further comprising the step of optimizing the portfolio of assets around the following variables: yield, liquidity, and security.

9. The method of claim 1 wherein establishing the mutual insurance company comprises securing necessary licenses for the mutual insurance company by purchasing an inactive mutual insurance company having the necessary licenses.

10. A computer-readable medium for terminating all or a part of a pension plan having one or more plan participants, and the pension plan being managed by a plan sponsor, the computer-readable medium bearing a computer program containing instructions which, when implemented by a computer, cause the computer to execute the steps of:
   receiving data representative of the pension plan, said data including benefits data owed under the pension plan to the pension plan participants;
   determining a target risk-based capital ratio range for the initial capitalization of a mutual insurance company based on at least the benefits data, the mutual insurance company having been established for the purpose of issuing annuities to the plan participants, and wherein the mutual insurance company has as its members the plan participants such that the plan participants have all the benefits of ownership of the mutual insurance company;
   calculating a funding ratio for the mutual insurance company, wherein the funding ratio reflects the approximate initial amount of capital required to realize the target risk-based capital ratio range;
   calculating a premium payment for the purchase of the one or more annuities issued by the mutual insurance company, wherein terms of the one or more annuities cover benefits owed to the plan participants under the pension plan, and wherein the one or more annuities are issued to the one or more plan participants;
   wherein the purchase of the one or more annuities by the pension plan via the premium payment to the mutual insurance company, and the issuance of the annuities by the mutual insurance company to the plan participants result in the termination of all or a part of the pension plan.

11. The computer-readable medium of claim 10 wherein the target risk-based capital range is equal to about 300% to about 350%.

12. The computer-readable medium of claim 10 wherein the computer program further contains instructions for receiving data representative of the asset risk for the portfolio of assets held by the mutual insurance company, and wherein calculating a funding ratio for the mutual insurance company is based on the asset risk in view of the target risk-based capital ratio range.

13. The computer-readable medium of claim 10 wherein the computer program further contains instructions for:
   periodically calculating a risk-based capital ratio of the mutual insurance company;
   determining whether an additional capital payment to the mutual insurance company is required in accordance with a surplus maintenance agreement; and
   indicating the amount of the additional capital payment.

14. The computer-readable medium of claim 10 wherein the computer program further contains instructions for calculating a longevity risk for the annuity liabilities of the mutual insurance company, and wherein calculating the funding ratio is based on the longevity risk such that the funding ratio is sufficient to account for the longevity risk.

15. The computer-readable medium of claim 10 wherein the computer program further contains instructions for periodically calculating a policy dividend based on a proportion of excess capital as a percentage of liabilities, a difference between asset yield and the applied discount rate, and a realization of redundancies.

16. The computer-readable medium of claim 10 wherein the computer further contains instructions for receiving data representative of plan participants, said data comprising the ages and gender of the plan participants.

17. The computer-readable medium of claim 10 wherein the computer further contains instructions for optimizing the portfolio of assets around the following variables: yield, liquidity, and security.

18. An apparatus for executing a program for terminating all or a part of a pension plan, the pension plan having one or more plan participants, and the pension plan being managed by a plan sponsor, the apparatus comprising:
   a processor;
   a display;
   a memory coupled to the processor and containing instructions executable by the processor which, when implemented by the processor, cause the processor to execute the steps of:
      receiving data representative of the pension plan, said data including benefits data owed under the pension plan to the pension plan participants;
      determining a target risk-based capital ratio range for the initial capitalization of a mutual insurance company based on at least the benefits data, the mutual insurance company having been established for the purpose of issuing annuities to the plan participants and wherein the mutual insurance company has as its members the plan participants such that the plan participants have all the benefits of ownership of the mutual insurance company;
      calculating a funding ratio for the mutual insurance company, wherein the funding ratio reflects the approximate amount of initial capital required to realize the target risk-based capital ratio range; and
      calculating a premium payment for the purchase of the one or more annuities issued by the mutual insurance company, wherein terms of the one or more annuities cover benefits owed to the plan participants under the pension plan, and wherein the one or more annuities are issued to the one or more plan participants;
   wherein the purchase of the annuities by the pension plan via the premium payment to the mutual insurance company, and the issuance of the annuities by the mutual insurance company to the plan participants result in the termination of the pension plan.

19. The apparatus of claim 18 wherein the target risk-based capital range is equal to about 300% to about 350%.

20. The apparatus of claim 18 wherein the memory further contains instructions which, when implemented by the processor, cause the processor to execute the step of receiving data representative of the asset risk for the portfolio of assets held by the mutual insurance company, and wherein calculating a funding ratio for the mutual insurance company is based on the asset risk in view of the target risk-based capital ratio range.

21. The apparatus of claim 18 wherein the memory further contains instructions which, when implemented by the processor, cause the processor to execute the steps of:
   periodically calculating a risk-based capital ratio of the mutual insurance company;
   determining whether an additional capital payment to the mutual insurance company is required in accordance with a surplus maintenance agreement; and
   indicating the amount of the additional capital payment.

22. The apparatus of claim 18 wherein the memory further contains instructions which, when implemented by the processor, cause the processor to execute step of calculating a longevity risk for the annuity liabilities of the mutual insurance company, and wherein calculating the funding ratio is based on the longevity risk such that the funding ratio is sufficient to account for the longevity risk.

23. The apparatus of claim 18 wherein the memory further contains instructions which, when implemented by the processor, cause the processor to execute the step of periodically calculating a policy dividend based on a proportion of excess capital as a percentage of liabilities, a difference between asset yield and the applied discount rate, and a realization of redundancies.

24. The apparatus of claim 18 wherein the memory further contains instructions which, when implemented by the processor, cause the processor to execute the step of receiving data representative of plan participants, said data comprising the ages and gender of the plan participants.

25. The apparatus of claim 18 wherein the memory further contains instructions which, when implemented by the processor, cause the processor to execute the step of optimizing the portfolio of assets around the following variables: yield, liquidity, and security.

* * * * *